Apr. 17, 1923.
E. E. NOVOTNY
1,451,783
MOLDED SOUND REPRODUCTION ARTICLE
Filed Jan. 21, 1921
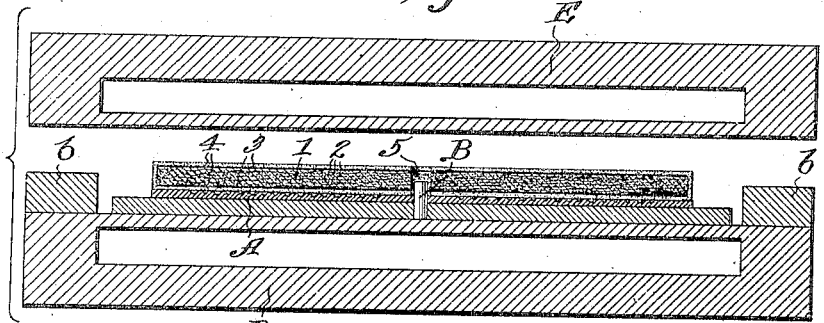
Fig. 1.
Fig. 3. Fig. 2.
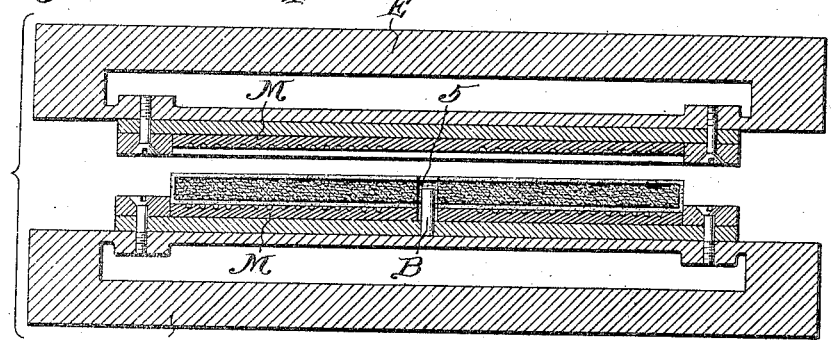
Fig. 4.
Fig. 5.
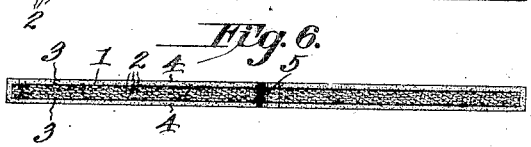
Fig. 6.
Inventor
Emil E. Novotny,
By his Attorneys
Meyers, Cavanagh & Hyde Patented Apr. 17, 1923.

1,451,783

UNITED STATES PATENT OFFICE.

EMIL E. NOVOTNY, OF LOGAN, PHILADELPHIA, PENNSYLVANIA, ASSIGNOR TO JOHN STOGDELL STOKES, OF PHILADELPHIA, PENNSYLVANIA.

MOLDED SOUND-REPRODUCTION ARTICLE.

Application filed January 21, 1921. Serial No. 438,926.

*To all whom it may concern:*

Be it known that I, EMIL E. NOVOTNY, a citizen of the United States, and resident of Logan, Philadelphia, in the county of Philadelphia and State of Pennsylvania, have invented certain new and useful Improvements in Molded Sound-Reproduction Articles, of which the following is a specification.

This invention relates to the manufacture of articles for use in the art of sound reproduction, such as sound records and matrices, and has particular application to the utilization of an infusible synthetic resin in molding such articles.

As is well known, certain synthetic resins such as phenolic condensation products possess the characteristics of reacting under the application of heat to first assume a melted or fusible state and then hardening or setting into a non-flowing or infusible condition. Such a synthetic resin in its melted or fusible condition readily lends itself to the molding or fashioning of the desired article, but heretofore it has been deemed impracticable to form an article after the synthetic resinous mass has reacted to its hard, non-melting or infusible stage, and, therefore, it has been the general practice to fuse or melt and then harden and set the material during the molding of an article, that is to say, in the manufacture of a shape, the synthetic resin in its raw or fusible state has been applied to the mold or matrix and then subjected to heat and pressure while in the matrix so that the material would first melt or fuse to render it moldable, and then harden and set to give the article a permanent infusible form.

The disadvantages of this method, however, are that the fusible material during the molding operation has a tendency to flow away from the lines of pressure, thereby producing irregular and imperfect surfaces on the record. Furthermore, when the fusible material is hardened in the mold it has a tendency to stick or adhere to the latter, rendering it difficult to strip the molded record from the matrix without marring or injuring the surface thereof, particularly if these be records of the "lateral" groove type where the record grooves are relatively deep. Furthermore, during the reaction of such fusible resin in the molding operation ammonia, water and water gas are generated, and portions of these gases are necessarily imprisoned in the mass, and are liable to cause blistering, distortions and warping on the surface of the completed record. This process on the whole is very slow and requires the greatest care to avoid the production of imperfect records and also usually requires the use of metallic matrices owing to the affinity which the fusing or melting resin has for surfaces of synthetic resinous material. Consequently although a synthetic faced matrix is of greater strength and is more economical than a metallic matrix, it has been impractical heretofore to use such a synthetic resinous matrix in the molding of articles from fusible materials.

In some instances it has been proposed to render the synthetic resin permanently thermoplastic by adding thereto a solid solvent of plasticity agent, so that when an article had been molded from this composition, and permitted to harden and set, as by cooling, the material of such article might be subsequently again rendered fusible by the application of heat. But this involves the addition to the synthetic resin of a distinct element, a thermo plasticity agent, which resulted in a composition possessing certain disadvantages.

For example such a composition also has a peculiar affinity for and will stick to synthetic resinous matrices, due to the presence of the plasticity agent or solid solvent, and the material loses its quite infusible nature, in that it is practically impossible to bring it to the desired state of hardness or infusibility, so that a record made from such a permanently thermoplastic composition is easily marred or scratched by the reproducing needle and the playing of such a record is accompanied by continuous scratching or hissing noises.

It has also been proposed, in the manufacture of sound records to apply a varnish or layer of fusible synthetic resin to a matrix and then heat the coated matrix for about 18 hours, at a relatively low temperature, to drive off the gases without undue bubbling or blistering, and to convert the synthetic resin into an infusible reacted sheet. Upon this infusible facing a backing blank, usually containing a fusible synthetic resin or other soft cementitious material has been imposed, and heat and pressure then applied to convert all of the synthetic resin into an infusible condition and to unite the backing blank with the infusible face blank, the integral article being then stripped from the matrix, the latter being in the nature of a metallic disk.

This method is slow, tedious and expensive, requires the greatest skill in practice to avoid such gassing as will result in blistering, warping and roughening of the record surface. Furthermore it requires the use of expensive metal matrices and the maintaining of the presses and matrices in use for such an extended period as to cut down the per diem production to such an extent as to render the ultimate cost of production exceedingly expensive.

By the practice of my invention I have discovered that I may use a synthetic resinous material which has been rendered non-melting, non-flowing or infusible prior to the placing of the same in the matrix, and thereby I eliminate all of the disadvantages above recited and obtain certain positive and pronounced advantages. I have found that by reducing an infusible body of synthetic resin, in the nature of a condensation product, to a comminuted mass, and then subjecting the same to heat and pressure, I am enabled to weld the particles of the mass into a homogeneous body which will faithfully reproduce the characteristics of the matrix. I have described the action which takes place in the practice of my process as to welding of the particles, because I have found by experiment that there is no melting of the material in molding, and no pronounced flow of the particles, as the mass is substantially inert. For example if heat alone is applied to the powder or infusible synthetic resin, even at a temperature far above the melting temperature of such resins, for example the application of a temperature of 423 degrees F., the resin will still maintain its powdery infusible form without any sign of welding or union. On the other hand if pressure alone be applied, even to the extent of 2000 pounds to the square inch, the same result will take place and the comminuted mass will still maintain its powdery characteristics. However, if both heat and pressure be applied at a relatively low pressure and at a relatively low degree of temperature, the particles of the mass will weld or amalgamate into a homogeneous body. By the use of such infusible material I am enabled to use strong, cheap, synthetic resinous matrices without the danger of sticking or gassing, as the gas has already been removed from the resinous mass. The record molded from such an infusible body may also be stripped hot from the matrix, or without the necessity of cooling, thereby greatly speeding the process of quickly releasing the matrices for subsequent use in molding other records, thus tending to the economical production of a great many articles. Furthermore, I am enabled to make use of discarded infusible synthetic resinous articles, as these may be ground up to powdery form and employed for molding new records, thus enabling me to salvage or reclaim material which has heretofore been considered unavailable for subsequent molding purposes.

My invention consists in the improved sound record set forth in and falling within the scope of the appended claims.

In the accompanying drawings:

Figure 1, is a view showing conventionally the platens of a heated hydraulic press and showing in cross section a matrix being molded against a master record.

Figure 2 is a cross sectional view of the molded matrix.

Figure 3 is a view showing the platens of the press conventionally and illustrating the molding of a double face phonograph record.

Figure 4 is a cross sectional view of the completed double face record.

Figures 5 and 6 are views illustrating forms of blanks which may be used in making the matrices and the sound records.

One preferred method of practicing my invention is as follows:

I take a body of fusible synthetic resin, such for instance as a phenolic condensation product composed of phenol and formaldehyde; or phenol and acetaldehyde; or phenol and furfural; preferably employing a suitable catalyst and a hardening agent in connection with the mixture employed. This fusible body of synthetic resin I subject to heat in an oven at a suitable temperature, say about 250 degrees F., for the desired period of time, say from 2 to 6 hours, for the purpose of baking the mass or reducing the same to a state of infusibility, while driving off all the gases of reaction, as well as any solvent or moisture that may be present. When the syntheic resin has been reduced to a state of infusibility, it is removed from the oven and ground or comminuted in a suitable mill, for example a ball mill, to reduce it to a powdery or comminuted mass. I then preferably form a blank such as is shown in Figure 5, which blank consists of a body of fibre 1. having an infusible powder incorporated therein as shown at 2. As this infusible powder cannot be dissolved the sheet is made in this instance by mechanically mixing the powder with the fibre pulp, as in a beating machine, and then forming the pulpy mass into sheets and drying the same. In lieu of this I may impregnate a sheet of fibre with a fusible solution of synthetic resin, and then subject the impregnated sheet to the action of heat in an oven to drive off the solvents and cause the reaction of the fusible synthetic resin until it assumes its infusible, non-melting form. Whichever method be used the fibre sheet 1 will have the fusible resin already incorporate therein. I then prefer to coat both faces of the blank shown in Figure 5 with a thin layer of cement, such as a phenolic varnish, shown at 3 in Figure 6, and sprinkle over the varnished surfaces layers of the infusible comminuted or powdery material made as heretofore described and which is shown at 4, the varnished layers causing adherence of the powder to the body of the blank. This sheet may then be heated in an oven to harden and set the cement or bonding layers 3 and to cause the outer surfaces of the blank to present powdery, porous surfaces. The blank thus formed will appear as shown in Figure 6 with all of the synthetic resin reacted to infusible condition. Such a blank is then imposed upon the master record A, said blank having a center hole 5 for the reception of the spindle B which centers the master record. The assembled record and matrix blank are then placed upon the lower platen D, provided with the usual bearers b and the press is closed so that the blank will be subjected to pressure against the master record and between the lower platen D and the upper platen E. At the same time heat is applied by the admission of a suitable heating agent to the hollow platens of the press in the usual manner. The result will be that the infusible powdery coatings 4 when subjected to heat and pressure will undergo a welding action so that the particles will be united or amalgamated in a homogeneous body and also united with the body of the blank. At the same time the grooves of the master record will be clearly, sharply and faithfully reproduced in the form of elevations on the contacting face of the matrix blank so that the matrix indicated as an entirety by the letter M in Figure 2 will result. While it is not necessary to apply the infusible powdery synthetic resinous layer to the back of the matrix blank I prefer to do this in order to obviate any liability of warping or distortions of the molded matrix. The matrix may be molded at a temperature of about 330 degrees F., for a period of from 1 to 5 minutes, which will result in the complete amalgamation of the powdery face. In the manufacture of the double face sound record, such as for example as shown at R in Figure 4, I use a pair of the matrices M, and fasten these in the press as shown in Figure 3. I also use a blank shown in Figure 6, and interpose this between the opposing molding faces of the two matrices and mounted upon the spindle as shown in said Figure 3. The press is then closed and heat and pressure applied for the same length of time as in the making of the matrix, that is to say at a temperature of about 330 degrees F., and this is maintained for a period of from 1 to 5 minutes with the accompanying pressure of about 500 to 2000 pounds to the square inch. When the press is opened the record may be readily removed or stripped from the matrices, without the liability of sticking, and will appear as shown in Figure 4.

The above is descriptive of the preferred manner of making the record and the matrix, but this may be subjected to certain modifications without departing from the spirit of the invention. For example I have found that I may produce an all synthetic, resinous matrix by sprinkling a layer of the infusible powder upon the face of the master record and then applying heat and pressure to the degree described, and similarly I may make an all phenolic record by depositing a layer of the powder upon the face of the matrix and welding the same under such heat and pressure. Furthermore, I may dispense with the bonding or cement layer for uniting the powder with the fibrous body of the blank, and simply sprinkle a layer of the powder upon the master record or upon the matrix, as the case may be, then applying fibre sheets, and then imposing a layer of the powder upon the back of the record. In such case the application of heat and pressure will weld the assembled mass into a homogeneous body.

What I claim is:

1. A sound record having a grooved sound reproducing face formed from a welded layer of synthetic resin.

2. An article for use in the art of sound reproduction, having a grooved face formed from a welded body of infusible, powdery, synthetic resin, and a backing sheet united therewith.

3. An article for use in the art of sound reproduction having a grooved face formed from a welded body of infusible, powdery, cementitious material and a backing united therewith comprising a fibrous body having an infusible cementitious material incorporated therein.

Signed at Philadelphia in the county of Philadelphia and State of Pennsylvania this 4th day of January A. D. 1921.

EMIL E. NOVOTNY.